(12) United States Patent
Schmitt et al.

(10) Patent No.: US 10,508,741 B2
(45) Date of Patent: Dec. 17, 2019

(54) COUPLING DEVICE FOR THE ROTARY COUPLING OF A PIVOT SHAFT OF A FLAP DIAPHRAGM OF AN EXHAUST GAS FLAP WITH A DRIVE ELEMENT

(71) Applicant: Eberspächer Exhaust Technology GmbH & Co. KG, Neunkirchen (DE)

(72) Inventors: Steffen Schmitt, Ostfildern (DE);
Georg Wirth, Kirchheim u. Teck (DE);
Maximilian Kühnemund, Donzdorf (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 129 days.

(21) Appl. No.: 15/640,694

(22) Filed: Jul. 3, 2017

(65) Prior Publication Data
US 2018/0010693 A1     Jan. 11, 2018

(30) Foreign Application Priority Data

Jul. 5, 2016 (DE) .................. 10 2016 112 302
Aug. 9, 2016 (DE) .................. 10 2016 114 704

(51) Int. Cl.
*F16K 1/22*     (2006.01)
*F02D 9/10*     (2006.01)
(Continued)

(52) U.S. Cl.
CPC ............. *F16K 1/22* (2013.01); *F02D 9/1005* (2013.01); *F02D 9/1065* (2013.01); *F16D 1/108* (2013.01);
(Continued)

(58) Field of Classification Search
CPC . F16D 1/108; F16D 3/005; F16D 3/18; F16D 1/112; F02D 9/1005; F02D 9/1065;
(Continued)

(56) References Cited

U.S. PATENT DOCUMENTS 1,214,307 A    1/1917   Hosford
1,245,813 A    11/1917   Smulski
(Continued)

FOREIGN PATENT DOCUMENTS

CN     202251496 U     5/2012
DE     70 30 430 U     10/1971
(Continued)

OTHER PUBLICATIONS

Translation of DE 7030430 (Year: 2019).*

*Primary Examiner* — Kevin F Murphy
*Assistant Examiner* — Kelsey E Cary
(74) *Attorney, Agent, or Firm* — McGlew and Tuttle, P.C.

(57) ABSTRACT

A coupling device (32) provides a rotary coupling of a pivot shaft (18) of a flap diaphragm (16) of an exhaust gas flap (10) with a drive element (34). The pivot shaft is to be rotated about a pivot axis (A). The coupling device (32) includes a first coupling part (36) with a first coupling area configured for coupling with the pivot shaft (18) and a second coupling part (38) with a second coupling area configured for coupling with the drive element (34). The first coupling part (36) and the second coupling part (38) are in a rotary coupling positive-locking meshing state with one another in the coupled state and are supported on one another in the direction of the pivot axis (A).

18 Claims, 7 Drawing Sheets

(51) Int. Cl.
*F16D 1/10* (2006.01)
*F16D 1/108* (2006.01)
*F16D 3/00* (2006.01)
*F16D 3/18* (2006.01)
*F16K 31/04* (2006.01)
*F02M 26/54* (2016.01)
*F02M 26/70* (2016.01)

(52) U.S. Cl.
CPC ............... *F16D 3/005* (2013.01); *F16D 3/18* (2013.01); *F16K 1/221* (2013.01); *F16K 31/043* (2013.01); *F02M 26/54* (2016.02); *F02M 26/70* (2016.02)

(58) Field of Classification Search
CPC ........ F16B 7/0406; F16B 7/0426; F16K 1/22; F16K 1/221; F16K 1/16; F16K 1/18; F16K 1/2007; F16K 1/2042; F16K 1/48; F16K 31/043
USPC .................................... 251/308, 304, 129.11
See application file for complete search history.

(56) References Cited

U.S. PATENT DOCUMENTS

| | | | |
|---|---|---|---|
| 1,769,107 | A | 7/1930 | Brown |
| 4,775,273 | A * | 10/1988 | Bauer ................. F16B 2/205 403/377 |
| 6,032,920 | A * | 3/2000 | Takahashi ............. F02D 9/06 137/907 |
| 6,598,619 | B2 | 7/2003 | Gagnon |
| 2010/0144452 | A1 | 6/2010 | Muenich et al. |
| 2013/0270470 | A1* | 10/2013 | Bonanno ............. F16K 31/041 251/129.11 |

FOREIGN PATENT DOCUMENTS

| | | |
|---|---|---|
| DE | 21 50 166 A1 | 4/1972 |
| DE | 10 2009 013 815 A1 | 9/2010 |
| DE | 10 2014 017523 A1 | 6/2015 |
| DE | 10 2014 113332 B3 | 11/2015 |
| JP | 2000-170 783 A | 6/2000 |
| WO | 2008/043600 A1 | 4/2008 |

\* cited by examiner

COUPLING DEVICE FOR THE ROTARY COUPLING OF A PIVOT SHAFT OF A FLAP DIAPHRAGM OF AN EXHAUST GAS FLAP WITH A DRIVE ELEMENT

CROSS REFERENCE TO RELATED APPLICATIONS

This application claims the benefit of priority under 35 U.S.C. § 119 of German Applications 10 2016 112 302.1, filed Jul. 5, 2016 and 10 2016 114 704.4, filed Aug. 9, 2016, the entire contents of which are incorporated herein by reference.

FIELD OF THE INVENTION

The present invention pertains to a coupling device for the rotary coupling of a pivot shaft of a flap diaphragm of an exhaust gas flap with a drive element.

BACKGROUND OF THE INVENTION

A coupling device for coupling a drive shaft of a flap drive with a pivot axis of a flap diaphragm of an exhaust gas flap with a C-shaped coupling element made of a wire material or the like is known from DE 10 2009 013 815 A1. In its coupling areas provided by respective C-legs, the coupling element meshes with associated recesses of the drive shaft, on the one hand, and of the pivot shaft, on the other hand, and this establishes a rotary coupling between these two components. The two C-legs are prestressed in the direction away from one another in the coupled state and thus load the pivot shaft of the flap diaphragm in the direction away from the drive shaft or the flap drive.

U.S. Pat. No. 6,598,619 B2 discloses an exhaust gas flap with a drive element configured in the form of a drive shaft and with a pivot shaft arranged coaxially thereto. A coupling device coupling the drive shaft with the pivot shaft for joint rotary motion comprises a coupling element having a box-shaped configuration.

SUMMARY OF THE INVENTION

An object of the present invention is to provide a coupling device for the rotary coupling of a pivot shaft of a flap diaphragm of an exhaust gas flap with a drive element, which has increased torsional rigidity while ensuring good thermal uncoupling of the pivot shaft from the drive element.

This object is accomplished according to the present invention by a coupling device for the rotary coupling of a pivot shaft of a flap diaphragm of an exhaust gas flap, which said pivot shaft is to be rotated about a pivot axis, with a drive element, comprising a first coupling part with a first coupling area configured for coupling with the pivot shaft and a second coupling part with a second coupling area configured for coupling with the drive element, wherein the first coupling part and the second coupling part are in a rotary coupling positive-locking meshing state with one another and are supported on one another in the direction of the pivot axis in the coupling state.

Due to the coupling device being configured with two coupling parts meshing with one another, a torsionally rigid connection is established between the element and the pivot shaft. This guarantees the possibility of positioning the flap diaphragm precisely during a corresponding adjusting motion of a flap drive. Further, a force acting on the pivot shaft in the direction of the pivot axis is applied due to the coupling parts being supported on one another in the direction of the pivot axis, so that this pivot shaft is held in a defined position in relation to a flap tube carrying it.

To provide the desired torsional rigidity as well as the axial prestress (force bias), it is proposed that the first coupling part and the second coupling part be made with sheet metal material, preferably steel sheet or titanium sheet. The use of sheet metal material is especially also advantageous because this provides, based on its generally flat or strip-shaped cross-sectional structure, a comparatively small cross-sectional area and hence a comparatively high resistance to heat conduction, and, on the other hand, it has a comparatively large surface, so that heat absorbed from the area of the exhaust gas flap can efficiently dissipate heat to the surrounding area.

To make it possible to couple the two coupling parts with the flap drive or the exhaust gas flap, on the one hand, and to make it possible to provide the positive-locking meshing between the two coupling parts, on the other hand, it is proposed that the first coupling part or/and the second coupling part provide an essentially sheet-shaped body area providing the coupling area thereof and, starting from the body area and bent at an angle in relation to the body area, at least two positive-locking meshing areas.

Provisions may be made in one embodiment variant, which can be embodied in a structurally simple manner and requires a small amount of space, for the first coupling part or/and the second coupling part to have two positive-locking meshing areas extending away from one another from the body area. The two positive-locking meshing areas may extend in opposite directions from the body area in relation to the pivot axis.

To make it possible to provide a reliably acting meshing functionality in the positive-locking meshing areas to be caused to mesh with one another in a positive-locking manner, it is proposed that at least one positive-locking meshing area have at least one positive-locking meshing recess for the positive-locking meshing of a positive-locking meshing projection of a positive-locking meshing area of the other coupling part at the first coupling part or/and at the second coupling part, or/and that at least one positive-locking meshing area have at least one positive-locking meshing projection for the positive-locking meshing with a positive-locking meshing recess of a positive-locking meshing area of the other coupling part at the first coupling part or/and at the second coupling part.

A configuration of the parts that is symmetrical especially in relation to the pivot axis can be achieved by one coupling part of the first coupling part and of the second coupling part having in its two positive-locking meshing areas at least one positive-locking meshing recess each and by the other coupling part of the first coupling part and of the second coupling part having at least one positive-locking meshing projection each in its two positive-locking meshing areas.

Great variety of assembling the two coupling parts for establishing the positive-locking meshing is made possible by an embodiment variant in which the first coupling part and the second coupling part have at least one positive-locking meshing recess and at least one positive-locking meshing projection in each positive-locking meshing area. Provisions are preferably made in this connection for reasons of stability for the at least one positive-locking meshing recess to be arranged closer to the body area of the coupling part than the at least one positive-locking meshing projection in at least one positive-locking meshing area.

The use of coupling parts having essentially identical configurations in relation to one another is made possible by a positive-locking meshing area having at least one positive-locking meshing recess and by the other positive-locking meshing area having at least one positive-locking meshing projection at the first coupling part and at the second coupling part. The configuration of the individual coupling parts itself can be kept simple if positive-locking meshing areas having at least one positive-locking meshing recess have no positive-locking meshing projection and positive-locking meshing areas having at least one positive-locking meshing projection have no positive-locking meshing recess.

Further, the fact that each coupling area has only one positive-locking meshing recess or/and only one positive-locking meshing projection may contribute to a simple configuration.

Provisions may be made in an alternative embodiment, which is especially advantageous especially for reasons of stability and based on the high level of symmetry, for the first coupling part or/and the second coupling part to have a star-shaped configuration with a plurality of positive-locking meshing areas extending away from the body area at mutually spaced locations and of positive-locking meshing recesses formed between these positive-locking meshing areas for the meshing of positive-locking meshing areas of the respective other coupling part.

Provisions may be made in this connection for a reliably acting axial support of the two coupling parts, which can be established in a simple manner, for the positive-locking meshing recesses to be configured as recesses expanding in the direction away from the body area, or/and for the positive-locking meshing areas to be configured as areas tapering in the direction away from the body area.

The configuration of a coupling device according to the present invention can be kept simpler and more cost-effective by the two coupling parts having an essentially identical configuration in relation to one another.

The present invention further pertains to an exhaust gas flap, especially for the exhaust gas stream of an internal combustion engine, comprising a flap tube, a flap diaphragm carried on a pivot shaft rotatable about a pivot axis in the interior of the flap tube as well as a pivot drive for the pivot shaft with a drive element, further comprising a coupling device of the above-described configuration coupling the drive element with the pivot shaft for joint rotation about the axis.

To make it possible to guarantee a stable coupling of the coupling device or of the coupling parts thereof with the pivot shaft, on the one hand, and with the drive element, on the other hand, it is proposed that a first opposite positive-locking coupling formation be provided at the pivot shaft and that a first positive-locking coupling formation that is a coupling meshing with the opposite positive-locking coupling formation be provided at the first coupling area of the coupling device, and that a second opposite positive-locking coupling formation be provided at the drive element and that a second positive-locking coupling formation that is in coupling meshing with the second opposite positive-locking coupling formation be provided at the second coupling area of the coupling device, wherein preferably at least one positive-locking coupling formation or opposite positive-locking coupling formation preferably has a polygonal outer profile or star profile and the respective associated opposite positive-locking coupling formation or positive-locking coupling formation has a complementary polygonal inner profile or star profile.

To provide a defined positioning of the pivot shaft, provisions may be made in an exhaust gas flap configured according to the present invention for the first coupling area to be prestressed (force biased) in the direction of the pivot shaft and for the second coupling area to be prestressed in the direction of the drive element, preferably such that the pivot shaft is pressed by the coupling device in the direction away from the drive element.

The above-mentioned prestressing of the two coupling areas in the direction of the assembly unit to be coupled with these areas for joint rotation, namely, the pivot shaft or the drive element, may, furthermore, be used according to the present invention to generate a stable coupling between a respective coupling area and the assembly unit to be coupled therewith. It is proposed for this purpose that the first opposite coupling formation be configured as tapering in the direction of the drive element, or/and that the second opposite positive-locking coupling formation be configured as tapering in the direction of the pivot shaft.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
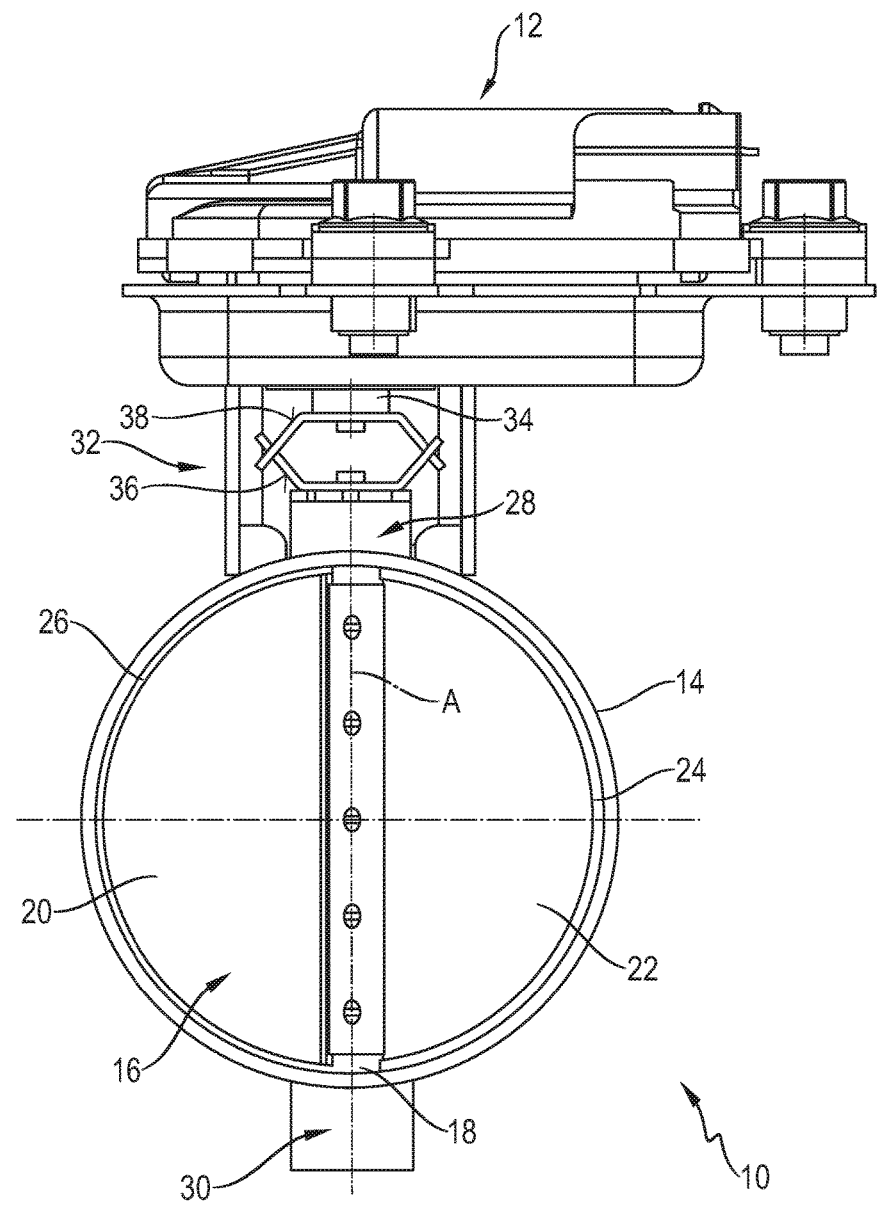
FIG. 1 is a lateral view of an exhaust gas flap with an associated flap drive.

Referring to the drawings, FIG. 1 shows in a lateral view an exhaust gas flap with a flap drive 12 associated with same, which said exhaust gas flap is generally designated by 10 and can be used, for example, in an exhaust system of an internal combustion engine. The exhaust gas flap 10 comprises a flap tube 14, in which a flap diaphragm generally designated by 16 is carried pivotably about a pivot axis A on a pivot shaft 18. The flap diaphragm 16 comprises two flap wings 20, 22, which are in contact with flap stops 24, 26 provided on the inner circumference of the flap tube 14 when the flap diaphragm 16 is positioned in a blocked position. At its two axial end areas 28, 30, the pivot shaft 18 is carried rotatably or pivotably about the pivot axis A in relation to the flap tube 14 by means of respective mounting devices. In its first axial end area 28, the pivot shaft 18 is coupled for joint rotation with a drive element 34 of the flap drive 12, for example, a drive shaft, by means of a coupling device described below. The pivot shaft 18 may be coupled in this area with the coupling device 32 directly or via a component not rotating therewith.

Figure 2:
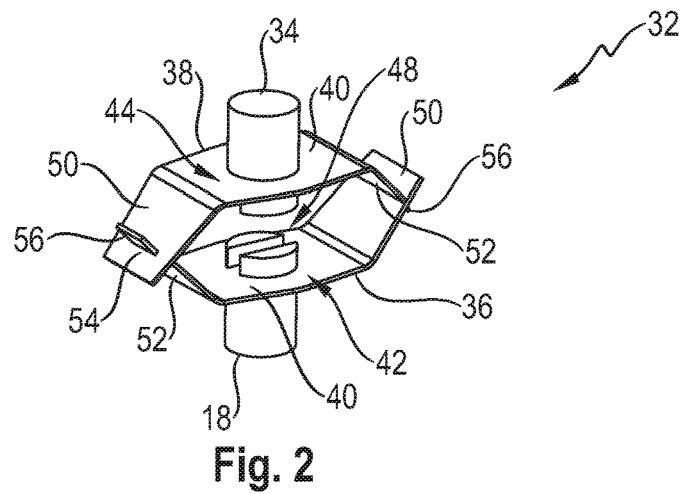
FIG. 2 is a perspective view of a first embodiment of a coupling device.
Figure 3:
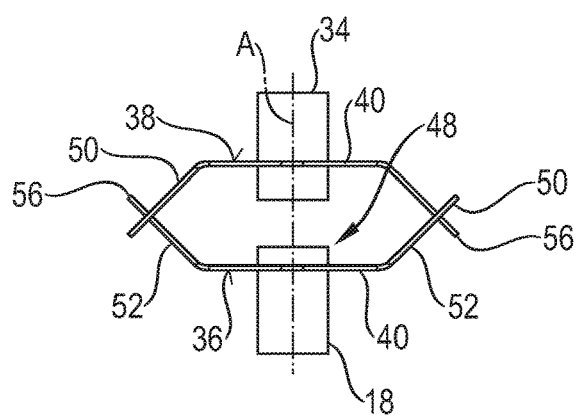
FIG. 3 is a lateral view of the coupling device according to FIG. 2.
Figure 4:
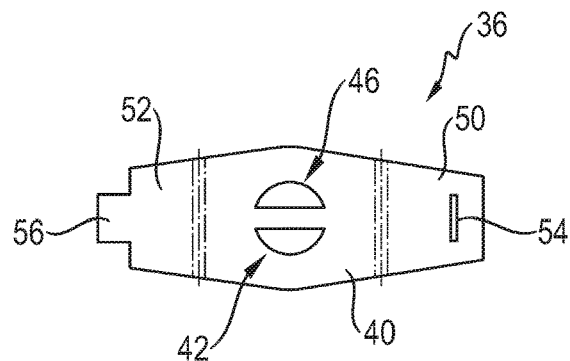
FIG. 4 is a top view of the coupling part of the coupling device according to FIG. 2.

A first type of configuration of a coupling device 32 is shown in FIGS. 2 through 4. The coupling device 32 comprises a first coupling part 36 coupled with the pivot shaft 18 for joint rotation as well as a second coupling part 38, which is of an identical configuration and is coupled with the drive element 34 for joint rotation. The two coupling parts 36, 38 are made of flat material or strip material, preferably from sheet metal material, e.g., steel sheet, especially spring steel sheet, or of a titanium sheet, and are manufactured by cutting out from a sheet-shaped metal sheet blank.

As is illustrated on the basis of the first coupling part 36 shown in FIG. 4, each of the two coupling parts 36, 38 comprises in a central area a sheet-shaped body part 40, wherein the first coupling area 42 of the coupling part 36 is provided for nonrotating coupling with the shaft 18 in the body area 40 of said coupling part 36 and the second coupling area 44 is provided for the nonrotating coupling with the drive element 34 in the body area 40 of said second coupling part 38. Each of the two coupling areas 42, 44 preferably comprises a positive-locking coupling formation 46, which meshes in a rotary coupling manner, with a complementarily shaped opposite positive-locking coupling formation 48 of the pivot shaft 18 and of the drive element 34. As can be seen, for example, in FIGS. 2 and 4, each positive-locking coupling formation 46 may have two, for example, circle segment-shaped recesses, with which complementarily shaped projections of the associated opposite positive-locking coupling formation 48 mesh. Since the two coupling parts 36, 38 are preferably of an identical configuration in relation to one another, the opposite positive-locking coupling formations 48 provided on the pivot shaft 18 or on the drive element 34 advantageously also have a mutually identical configuration.

At end areas of the body area 40, which are opposite each other in relation to the pivot axis A, each of the coupling parts 36, 38 has positive-locking meshing areas 50, 52 bent at an angle in the same axial direction in relation to the body area 40. Just like the body area 40, these may also have an essentially planar configuration. A slot-shaped positive-locking meshing recess 54, whose longitudinal extension is essentially at right angles to the longitudinal extension of the entire coupling part 36 and 38, respectively, is formed in the positive-locking meshing area 50. A positive-locking meshing projection 56 extending in the direction away from the body area 40 is formed in the other meshing area 52. This projection 56 is dimensioned such that it can be inserted into the positive-locking meshing recess 54 of the respective other body part.

As is shown in FIGS. 2 and 4, the two coupling parts 36, 38 are arranged at the pivot shaft 18 and at the drive element 34 such that their two body areas 40 are oriented essentially parallel to one another and essentially at right angles to the pivot axis A, while the positive-locking meshing areas 50, 52 of the two coupling parts 36, 38 are oriented such that they extend towards the respective other coupling part 38 and 36. The positive-locking meshing projection 56 at the positive-locking meshing area 52 of the first coupling part 36 now meshes with the positive-locking meshing recess 54 at the positive-locking meshing area 50 of the second coupling part 38. The coupling projection 56 at the positive-locking meshing area 52 of the second coupling part 38 meshes with the positive-locking meshing recess 54 at the positive-locking meshing area 50 of the first coupling part 36. Since the positive-locking coupling projections 56 and positive-locking meshing recesses 54 are coordinated with one another such that these mesh with one another essentially without clearance, stable and defined rotary coupling of the two coupling parts 36, 38 with one another is guaranteed. This is supported by the fact that the two coupling parts 36, 38 with their positive-locking meshing areas 50, 52 are in contact with one another with a prestress in the axial direction, so that due to it being supported axially at the second coupling part 38, the first coupling part 36 is prestressed in the direction of the drive element 34 and away from the flap drive 12 and in the direction of the pivot shaft 18. An axial load is applied hereby to the pivot shaft 18, so that despite the inevitable bearing clearance in the bearings mounting the pivot shaft 18 rotatingly in relation to the flap tube 14, the pivot shaft 18 is held in a defined axial position. A defined meshing of the coupling formations 46 with the opposite positive-locking coupling formations 48 is also guaranteed at the same time by this axial support or prestress of the two coupling parts 36, 38 on one another.

Figure 5:
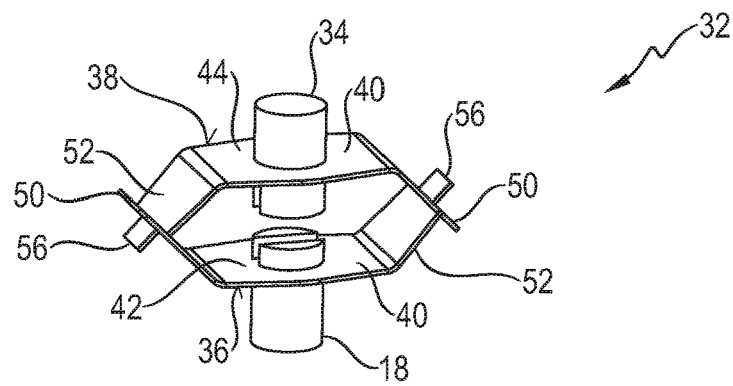
FIG. 5 is a perspective view corresponding to FIG. 2, showing an alternatively configured coupling device.
Figure 6:
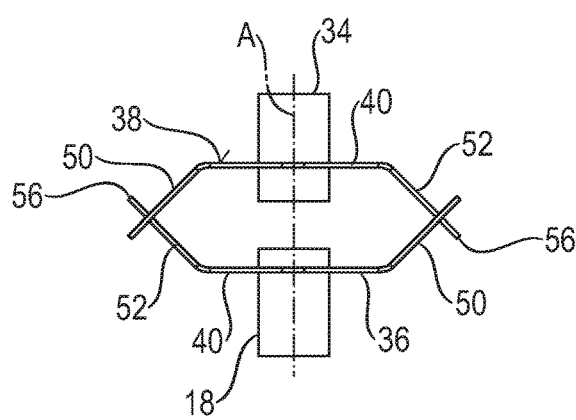
FIG. 6 is a lateral view of the coupling device according to FIG. 5.
Figure 7:
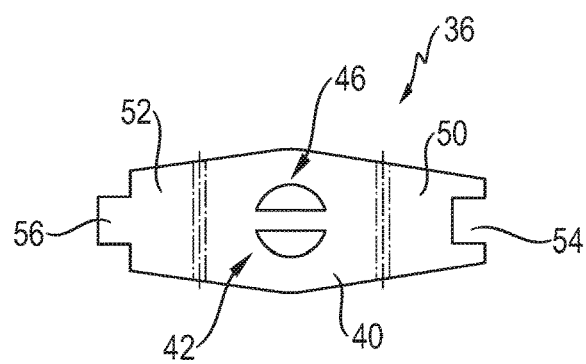
FIG. 7 is a top view of the coupling part of the coupling device according to FIG. 5.

An alternative type of configuration of a coupling device is shown in FIGS. 5 through 7. For the most part, this corresponds to the type of configuration described above with reference to FIGS. 2 through 4 and areas that correspond to above-described components and areas are designated by the same reference numbers.

It is seen that the coupling parts 36, 38, which are likewise configured as identical parts, are configured with a coupling recess 54 open in the direction away from the body area 40 in their respective positive-locking meshing area 50 in the embodiment shown in FIGS. 5 through 7. This simplifies the process of axially assembling the two coupling parts 36, 38, because these only need to be moved axially towards one another to establish a respective positive-locking meshing projection 56 in the associated positive-locking meshing recess 54, so that the positive-locking meshing areas 50, 52 associated with one another in pairs will come into axial contact with one another. A process of threading or inserting a respective coupling projection into a slot-shaped coupling recess is not necessary here.

Figure 8:
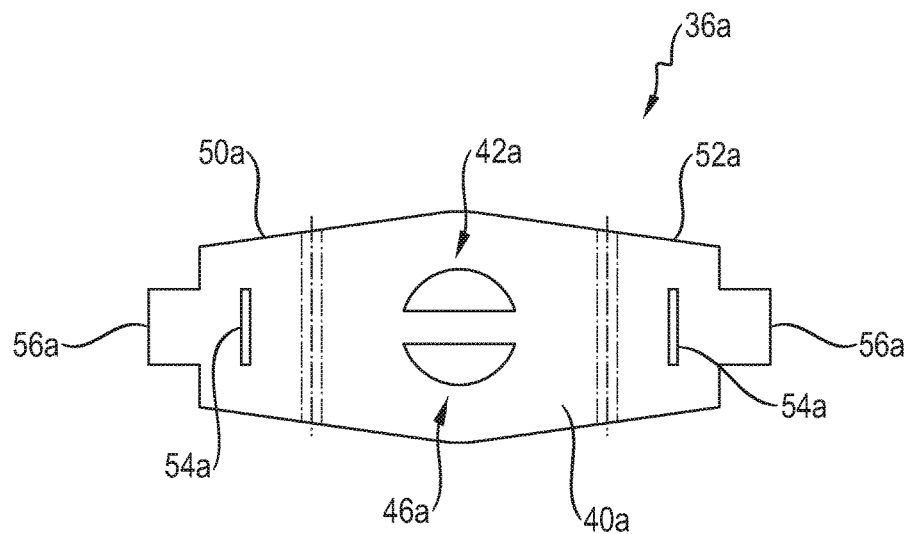
FIG. 8 is a top view of a coupling part of an alternative type of configuration of a coupling device.
Figure 9:
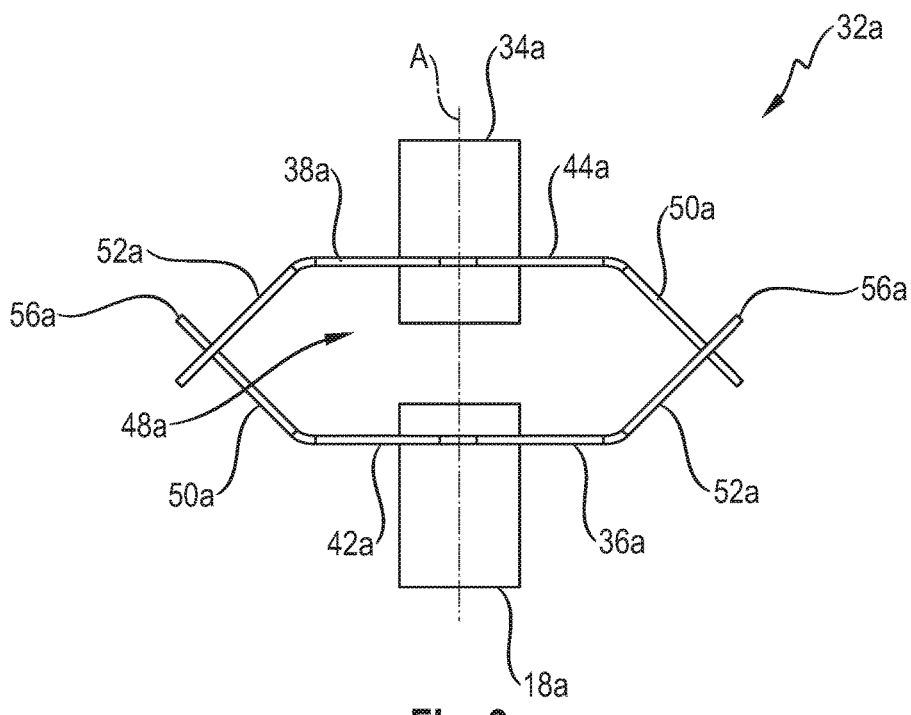
FIG. 9 is a lateral view of a coupling device with coupling parts of the type of configuration according to FIG. 8.

Another alternative type of configuration of a coupling device or of a coupling part therefor is shown in FIGS. 8 and 9. Components and areas that correspond to above-described components and areas are designated by the same reference number with an "a" added.

Identical parts are used for the two coupling parts 36*a*, 38*a* in the coupling device 32*a* according to FIGS. 8 and 9 as well. As is shown as an example in FIG. 8 on the basis of the coupling part 36*a*, these coupling parts 36*a*, 38*a* also comprise, for example, a sheet-shaped body area 40*a* with the positive-locking coupling formation 46*a* formed centrally therein for meshing with a respective opposite positive-locking coupling formation 48*a* of the pivot shaft 18*a* or of the drive element 34*a*. The two positive-locking meshing areas 50*a* and 52*a*, respectively, are in contact with one another at end areas of the body area 40*a*, which are oriented opposite each other. A positive-locking meshing recess 54*a* and a positive-locking meshing projection 56*a* each are provided in each positive-locking meshing area 50*a*, 52*a*. The positive-locking meshing recess 54*a* may correspond here to the shape described above with reference to FIG. 4, i.e., it may have a slot-shaped configuration, and may be located closer to the body area 40*a* than is the associated positive-locking meshing projection 56*a*.

When assembling the coupling device 32*a* with the pivot shaft 18*a* and with the drive element 34*a*, it is possible, for example, to proceed such that the positive-locking meshing projections 56*a* of the coupling part 36*a* are inserted into the positive-locking meshing recesses 54*a* of the coupling part 38*a*, doing so such that with both coupling parts 36*a*, 38*a* being supported at the pivot shaft 18*a* and at the drive element 34*a*, respectively, the two coupling parts 36*a*, 38*a* are supported on one another in the direction of the axis A while said pivot axis also undergoes an elastic deformation and as a result they prestress the pivot shaft 18*a* in the direction away from the drive element 34*a*. For example, after bringing the two coupling parts 36*a*, 38*a* to one another, the entire coupling device 32 can be brought into a rotary coupling meshing state first with the pivot shaft 18*a* or with the drive element 34*a*, and the assembly unit thus provided is then brought to the respective other assembly unit and the associated coupling part is caused to have a rotary coupling meshing therewith.

It should be noted that the above-described coupling devices or their coupling parts may also be provided in another configuration. For example, the body area could thus have an essentially non-planar but curved configuration and pass with this curvature over into the respective positive-locking meshing areas, so that, for example, the entire coupling part also has a curvature-like configuration, in which the positive-locking meshing areas are likewise bent at an angle in the area of the positive-locking meshing projections or positive-locking meshing recesses in relation to the area in which the coupling areas are located on the drive element and on the pivot shaft. It would also be possible to provide a plurality of positive-locking meshing recesses and correspondingly also a plurality of positive-locking meshing projections in the positive-locking meshing areas, so that a tooth-like meshing of the two coupling parts can be achieved.

In one type of configuration, in which the two coupling parts are not configured as identical parts, positive-locking meshing recesses may be provided on one of the coupling parts in both positive-locking meshing areas, shown as an example as well as in FIG. 7 on the basis of the positive-locking meshing recess 54, while positive-locking meshing projections are provided in both positive-locking meshing areas on the other coupling part. The basic structure of such coupling parts corresponds to the structure shown in FIGS. 2-9, for example, with a sheet-shaped body area and with positive-locking meshing areas extending away therefrom bent at an angle in opposite end areas either with positive-locking meshing recesses or positive-locking meshing projections.

Figure 10:
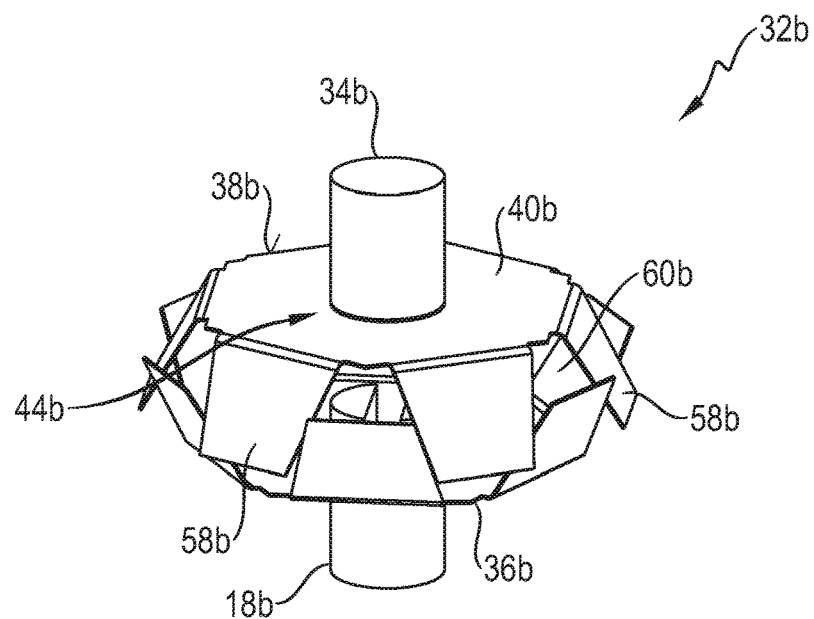
FIG. 10 is a perspective view of a coupling device of an alternative type of configuration.
Figure 11:
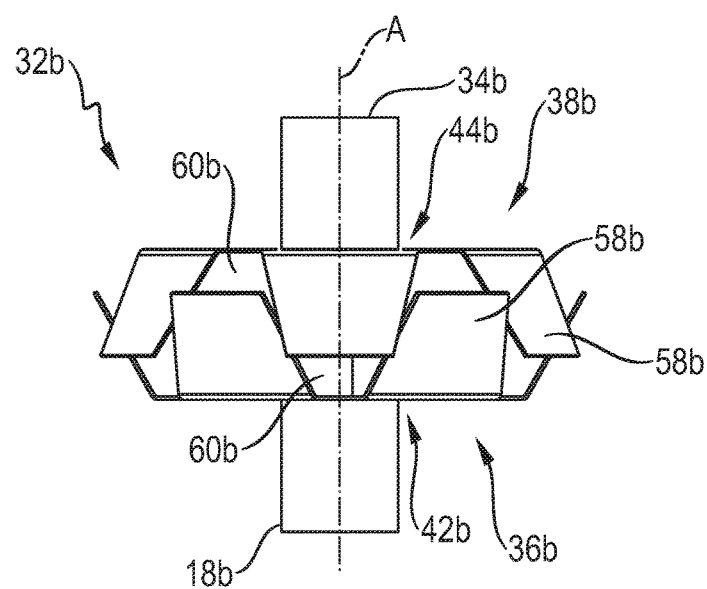
FIG. 11 is a lateral view showing the coupling device according to FIG. 11.
Figure 12:
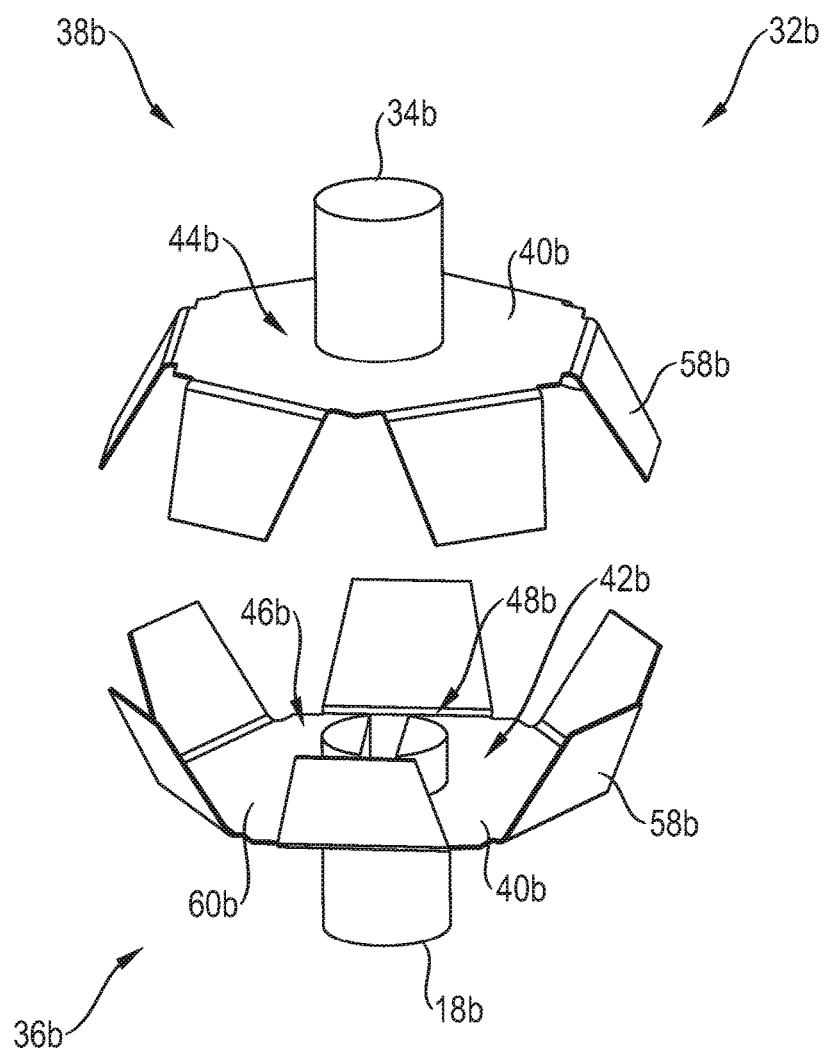
FIG. 12 is a perspective view of the coupling device according to FIG. 10.

Another alternative type of configuration of a coupling device is shown in FIGS. 10, 11 and 12. Components and areas that correspond to above-described components and areas are designated by the same reference numbers with a "b" added.

The two coupling parts 36*b*, 38*b* are configured as identical parts in the coupling device 32*b* according to FIGS. 10 through 12. Each of the coupling parts 36*b*, 38*b* has an essentially star-shaped configuration with a respective sheet-shaped or planarly configured body area 40*b* and, in an outer circumferential area thereof, with a plurality of positive-locking meshing areas 58*b* extending bent at an angle from the body area 40*b* at an axially spaced location in relation to the pivot axis A and in relation to the body area 40*b*. Respective positive-locking meshing recesses 60*b* are provided in the circumferential direction between adjacent positive-locking meshing areas 58*b*. In the assembled state, the positive-locking meshing areas 58*b* of one of the two coupling parts 36*b*, 38*b* mesh with the positive-locking meshing recesses 60*b* of the other coupling part 38*b*, 36*b* and are supported thereon in the direction of the pivot axis A. An axial load acting on the pivot shaft 18*b*, which prestresses this into a defined position, is applied in this type of embodiment as well, in which the two coupling parts 36*b*, 38*b* are preferably made of a springy material, e.g., steel sheet or titanium sheet, based on this springy supporting of the two coupling parts 36*b*, 38*b*. This meshing of the two coupling parts 36*b*, 38*b* with one another is simplified by the positive-locking meshing recesses 60*b* being configured as expanding in the direction away from the body area 40*b* and by the positive-locking meshing areas 58*b* being configured as tapering in the direction from the body area 40*b*. Based on this configuration and based on the mutual meshing, centering of the two coupling parts 36*b*, 38*b* in relation to the pivot axis A is achieved at the same time as well.

It should be noted that the two coupling parts 36*b*, 38*b* could, of course, be provided with a different number of positive-locking meshing areas 58*b* and positive-locking meshing recesses 60*b* in the type of configuration shown in FIGS. 10 through 12. The two coupling parts 36*b*, 38*b* could also be configured, at least in their respective body area 40*b*, with a structure differing from the planar structure shown, for example, with a structure arched in a shell-like manner, and then continue in a correspondingly arched manner in the positive-locking meshing areas 58*b*, which are now likewise bent at an angle in relation to the body area 40*b*.

FIGS. 13*a* through 13*d* show different examples of the configuration of the opposite coupling formations 58 provided on the drive element 34 and on the pivot shaft 18, which coupling formations may, of course, also be used in the types of configuration shown in FIGS. 8-12.

Figure 13:
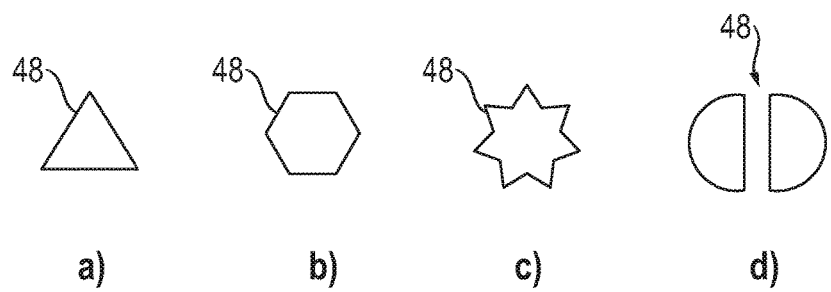
FIG. 13a is a view showing one of different examples of a configuration of positive-locking coupling formations and opposite coupling formations.
FIG. 13b is a view showing another of different examples of a configuration of positive-locking coupling formations and opposite coupling formations.
FIG. 13c is a view showing another of different examples of a configuration of positive-locking coupling formations and opposite coupling formations.
FIG. 13d is a view showing another of different examples of a configuration of positive-locking coupling formations and opposite coupling formations.

The opposite positive-locking coupling formation 48 according to FIG. 13*a* is provided, in principle, with a polygonal outer profile in the form of a triangle. FIG. 13*b* also shows a polygonal outer profile, here in the form of an external hexagon. It should be noted that a different number of corners or edges, for example, a 4-cornered or 5-cornered configuration, is, of course, also possible.

FIG. 13*c* shows a star-shaped configuration of the opposite positive-locking coupling formation 48, which may be based, for example, on the geometry of a screwdriver to be used for a TORX screw head. It should be noted that the number of outwardly projecting points may be different in case of such a star-shaped configuration than is shown in FIG. 13c.

FIG. 13d shows a structure that may correspond, for example, to the structure shown in FIG. 5. The opposite positive-locking coupling formation 48 has two meshing areas located next to each and projecting axially here with a respective semicircular geometry and at mutually spaced locations. It should be noted especially in connection with this type of configuration that the opposite positive-locking formation 48 may have a different number of such projections with different geometries.

In association with a respective opposite positive-locking coupling formation 48, which is always provided by the configuration of the axial end areas of the pivot shaft 18 or of the drive element 34, which are to be fixed thereon and which thus form an axial extension thereof, the positive-locking coupling formations 46 are configured on the coupling parts 36, 38 as complementarily shaped, i.e., as correspondingly shaped and dimensioned openings, which guarantee an essentially clearance-free mounting of a respective opposite positive-locking coupling formation 48. It can be guaranteed that the coupling parts 36, 38 are held axially together with the pivot shaft 18 or with the drive element 34 can be guaranteed, on the one hand, by the coupling parts 36, 38 with their coupling areas 42, 44 being supported axially on respective shoulder-like radial projections on the pivot shaft 18 and on the drive element 34, respectively. In addition, a fastening bolt, for example, a stud or a clinch bolt, which extends, for example, in conjunction with a washer, radially over a respective coupling part 36 or 38 and thus prevents same from becoming detached, may be inserted into the axial end of the pivot shaft 18 or of the drive element 34 for axial fixation in the respective other direction.

Figure 14:
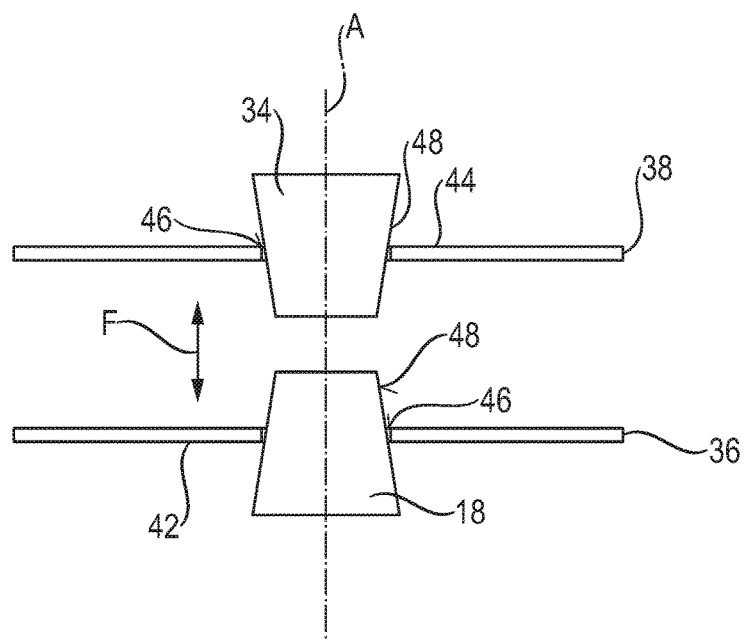
FIG. 14 is a detail view of the coupling areas of a coupling device, which are coupled with a drive element and with a pivot shaft, respectively.

FIG. 14 shows an especially advantageous example of the configuration of the opposite positive-locking coupling formation 48. The axial end areas of the pivot shaft 18 or of the drive element 34 are configured here as tapering, for example, tapering conically towards the respective other component. This may be embodied in all shapes of the opposite positive-locking coupling formations 48, especially in the shapes explained with reference to FIGS. 13a-13d.

It can be guaranteed due to this tapering shape of the opposite positive-locking coupling formations 48, taking into account the fact that the two coupling areas 42, 44 are prestressed in the manner explained above by a force F in the direction away from one another and thus towards the pivot shaft 18 or the drive element 34, that, on the one hand, the opposite positive-locking coupling formations 48 can easily be inserted into the associated positive-locking coupling formations 46, and that a clearance-free meshing, which thus generates a defined rotary coupling, is guaranteed at the same time due to the prestress of the coupling areas 42, 44 against the pivot shaft 18 or the drive element 34 and the axial support on the tapering areas, which support develops in the process. It may be unnecessary to provide for additional fastening elements, for example, studs, clinch bolts and washers, by which it can be guaranteed that the respective coupling parts 36, 38 will be held together in an axially fixed manner. The coupling device 32 is held in a meshing position with the pivot shaft 18 or the drive element 34 and centered between these due to its own axial prestress itself.

Even though the above-described coupling of the coupling device 32 with the pivot shaft 18 or the drive element 34 is especially advantageous based on the simple configuration and the defined rotary coupling, it should finally be noted that other types of connection, for example, screw connection or rivet connection, preferably with a plurality of respective bolts, welding, peening or the like, can be used for connecting the coupling device 32 to the pivot shaft 18 or/and to the drive element 34.

With the configuration of the coupling device with two coupling parts which can be caused to mesh with one another in a positive-locking manner, each of the coupling parts can be assembled during the assembly first with the associated assembly unit, i.e., the exhaust gas flap or the flap drive. The flap drive with the second coupling part arranged thereon can then be moved to the first coupling part already mounted on the exhaust gas flap in order to establish the meshing. The flap drive is then fixed, for example, by screw connection.

While specific embodiments of the invention have been shown and described in detail to illustrate the application of the principles of the invention, it will be understood that the invention may be embodied otherwise without departing from such principles.

What is claimed is:

1. An exhaust gas flap for an exhaust gas stream of an internal combustion engine, the exhaust gas flap comprising:
   a flap tube;
   a pivot shaft;
   a flap diaphragm carried in the interior of the flap tube on the pivot shaft and rotatable about a pivot axis;
   a pivot drive with a drive element driving the pivot shaft; and
   a coupling device coupling the drive element with the pivot shaft for joint rotation of the drive element and the pivot shaft about the pivot axis, the coupling device comprising:
   a first coupling part with a first coupling area configured to couple with the pivot shaft; and
   a second coupling part with a second coupling area configured to couple with the drive element, wherein the first coupling part and the second coupling part are in a rotary coupling positive-locking meshing state with one another and are made of spring material and are supported on one another in a direction of the pivot axis in the coupled state, such that the first coupling area is prestressed in a direction of the pivot shaft and the second coupling area is prestressed in a direction of the drive element, and that the pivot shaft is prestressed by the coupling device in the direction away from the drive element.

2. The exhaust gas flap in accordance with claim 1, wherein the first coupling part and the second coupling part are made of a sheet metal material.

3. The exhaust gas flap in accordance with claim 1, wherein the first coupling part or the second coupling part or both the first coupling part and the second coupling part comprise a sheet-shaped body area providing the coupling area and two positive-locking meshing areas, each of the two positive-locking meshing areas starting from the body area and being bent at an angle in relation to the body area.

4. The exhaust gas flap in accordance with claim 3, wherein the first coupling part or the second coupling part has, or both the first coupling and the second coupling part have, a star-shaped configuration with a plurality of positive-locking meshing areas extending at mutually spaced locations away from the body area and meshing recesses are formed between the positive-locking meshing areas for the meshing of positive-locking meshing areas of the respective other coupling part.

5. The exhaust gas flap in accordance with claim 4, wherein the positive-locking meshing areas are configured to extend in a direction away from the body area or the positive-locking meshing areas are configured as tapering in a direction away from the body area.

6. The exhaust gas flap in accordance with claim 1, wherein the first coupling part or the second coupling part or both the first coupling part and the second coupling part comprise a sheet-shaped body area providing the coupling area and two positive-locking meshing areas, each of the two positive-locking meshing areas extending away from one another and from the body area wherein the two positive-locking meshing areas extend in opposite directions from the body area in relation to the pivot axis.

7. The exhaust gas flap in accordance with claim 6, wherein:
   at least one positive-locking meshing area at the first coupling part or the second coupling part or both the first coupling part and the second coupling part has at least one positive-locking meshing recess for the positive-locking meshing of a positive-locking meshing projection of a positive-locking meshing area of the other coupling part; or
   at least one positive-locking meshing area at 'the first coupling part or the second coupling part or both the first coupling has at least one positive-locking meshing projection for the positive-locking meshing with a positive-locking meshing recess of a positive-locking meshing area of the other coupling part.

8. The exhaust gas flap in accordance with claim 7, wherein the two positive-locking meshing areas of the first coupling part and the second coupling part comprise at least one positive-locking meshing recess and at least one positive-locking meshing projection.

9. The exhaust gas flap in accordance with claim 8, wherein the two positive-locking meshing areas of the first coupling part and the second coupling part each comprise at least one positive-locking meshing recess and at least one positive-locking meshing projection.

10. The exhaust gas flap in accordance with claim 9, wherein the at least one positive-locking meshing recess is arranged closer to the body area of the coupling part than the at least one positive-locking meshing projection.

11. The exhaust gas flap in accordance with claim 7, wherein
   one of the positive-locking meshing areas of the first coupling part and the second coupling part has at least one positive-locking meshing recess with no positive-locking meshing projection; and
   another of the other positive-locking meshing areas has at least one positive-locking meshing projection with have no positive-locking meshing recess.

12. The exhaust gas flap in accordance with claim 7, wherein each positive-locking meshing area has a single positive-locking meshing recess or a single positive-locking meshing projection.

13. The exhaust gas flap in accordance with claim 1, wherein the two coupling parts have an identical configuration in relation to one another.

14. The exhaust gas flap in accordance with claim 1, wherein:
   a first opposite positive-locking coupling formation is provided on the pivot shaft;
   a first positive-locking coupling formation, that is in a coupling meshing state with the first opposite positive-locking coupling formation, is provided on the first coupling area of the first coupling part;
   a second opposite positive-locking coupling formation is provided on the drive element;
   a second positive-locking coupling formation, that is in a coupling meshing state with the second opposite positive-locking coupling formation is provided on the second coupling area of the second coupling part; and
   at least one positive-locking coupling formation or opposite positive-locking coupling formation has a polygonal outer profile or star profile and the respective associated opposite positive-locking coupling formation has a complementary polygonal inner profile or star profile.

15. The exhaust gas flap in accordance with claim 14, wherein the first opposite positive-locking coupling formation is configured tapering in the direction of the drive element or the second opposite positive-locking coupling formation is configured tapering in the direction of the pivot shaft or both the first opposite positive-locking coupling formation is configured tapering in the direction of the drive element and the second opposite positive-locking coupling formation is configured tapering in the direction of the pivot shaft.

16. The exhaust gas flap in accordance with claim 14, wherein:
   the first coupling part or the second coupling part or both the first coupling part and the second coupling part comprises a sheet-shaped body area providing the coupling area and two positive-locking meshing areas, each of the two positive-locking meshing areas extending away from one another and from the body area; and
   at least one positive-locking meshing area at the first coupling part or the second coupling part or both the first coupling part and the second coupling part has at least one positive-locking meshing recess for the positive-locking meshing of a positive-locking meshing projection of a positive-locking meshing area of the other coupling part; or
   at least one positive-locking meshing area at the first coupling part or the second coupling part or both the first coupling has at least one positive-locking meshing projection for the positive-locking meshing with a positive-locking meshing recess of a positive-locking meshing area of the other coupling part.

17. The exhaust gas flap in accordance with claim 16, wherein the two positive-locking meshing areas of the first coupling part and the second coupling part comprise at least one positive-locking meshing recess and at least one positive-locking meshing projection.

18. The exhaust gas flap in accordance with claim 16, wherein
   one of the positive-locking meshing areas of the first coupling part and the second coupling part has at least one positive-locking meshing recess with no positive-locking meshing projection; and
   another of the other positive-locking meshing areas has at least one positive-locking meshing projection with have no positive-locking meshing recess.

* * * * *